(12) United States Patent
Smith et al.

(10) Patent No.: US 10,876,651 B2
(45) Date of Patent: Dec. 29, 2020

(54) LIGHTED MUNICIPAL VALVE KEY

(71) Applicant: CPI Excavating Inc., Harrison Township, MI (US)

(72) Inventors: Charles Smith, Algonac, MI (US); Gregory Coventry, Auburn Hills, MI (US)

(73) Assignee: CPI EXCAVATING, INC., Harrison Township, MI (US)

( * ) Notice: Subject to any disclaimer, the term of this patent is extended or adjusted under 35 U.S.C. 154(b) by 0 days.

(21) Appl. No.: 14/705,622

(22) Filed: May 6, 2015

(65) Prior Publication Data

US 2015/0323098 A1    Nov. 12, 2015

Related U.S. Application Data

(60) Provisional application No. 61/989,135, filed on May 6, 2014.

(51) Int. Cl.
| | | |
|---|---|---|
| *B25B 23/18* | (2006.01) | |
| *E03B 9/02* | (2006.01) | |
| *F16K 31/60* | (2006.01) | |
| *F16K 31/46* | (2006.01) | |

(52) U.S. Cl.
CPC ............ *F16K 31/607* (2013.01); *F16K 31/46* (2013.01); *E03B 9/02* (2013.01)

(58) Field of Classification Search
CPC .......... E03B 9/02; F16K 31/607; F16K 31/46; F21V 33/0084; B25B 23/18; B25B 29/00; B25F 5/021
USPC ........ 251/291, 292, 293; 362/109, 116, 119, 362/120
See application file for complete search history.

(56) References Cited

U.S. PATENT DOCUMENTS

| | | | |
|---|---|---|---|
| 4,348,922 A | 9/1982 | Harris et al. | |
| 5,505,237 A * | 4/1996 | Magne | B64F 1/28 137/342 |
| 6,199,998 B1 * | 3/2001 | Hsiao | B25B 23/18 362/119 |
| 6,364,500 B1 * | 4/2002 | McCalla | B25B 23/18 362/119 |
| 7,517,066 B1 * | 4/2009 | Gao | B41J 2/09 347/77 |
| 7,903,140 B2 * | 3/2011 | Metala | G01N 21/954 348/61 |
| 8,147,085 B2 * | 4/2012 | Pieren | B25B 23/18 362/119 |
| 2003/0202355 A1 * | 10/2003 | Parsons | A44B 15/00 362/398 |
| 2008/0078973 A1 * | 4/2008 | Richards | E03B 7/071 251/315.1 |

(Continued)

FOREIGN PATENT DOCUMENTS

CN      103170939 A  *  6/2013

OTHER PUBLICATIONS

Li, Jun. 26, 2013, CN103170939 (A), Original and Translation.*

*Primary Examiner* — Paul J Gray
(74) *Attorney, Agent, or Firm* — Warn Partners, P.C.

(57) ABSTRACT

Municipal valve key which includes a valve actuator engaging end; an elongated extension portion capable of extending into a municipal valve box; and a handle portion. The valve actuator engaging portion has a valve opening key end and includes a light for illumination of the valve actuator in the valve box.

6 Claims, 3 Drawing Sheets

(56) References Cited

U.S. PATENT DOCUMENTS

| | | | |
|---|---|---|---|
| 2008/0173138 A1* | 7/2008 | Dayton | A01C 5/02 81/53.1 |
| 2010/0296271 A1* | 11/2010 | Chien | B25B 23/18 362/119 |
| 2012/0276954 A1* | 11/2012 | Kowalsky | H04N 5/2252 455/556.2 |
| 2013/0071808 A1* | 3/2013 | Van der Laan | A61B 1/24 433/29 |

* cited by examiner

LIGHTED MUNICIPAL VALVE KEY

FIELD OF THE INVENTION

This application relates to a municipal valve key used for reaching and manipulating a deeply recessed (buried) municipal valve.

BACKGROUND OF THE INVENTION

Municipal valves of the like for shutting off residential and commercial main lines, are used in municipalities around the country. Typically, these are buried in a valve box, gate well, cub box or the like below the frost line typically around 6 feet but varies depending on the application under the earth. The box is typically a long tubular member with a cap and the valve which requires shutting off and turning on is at the base of the box or gate well.

In the past because of the limited area and depth, it is somewhat impossible for an operator to see the valve they are trying to engage and the valve key operation is random or touch and go. This provides an imprecise and challenging method of trying to engage and manipulate the valve in order to turn on or off the water supply.

SUMMARY OF THE INVENTION

Municipal valve key which includes a valve actuator engaging end; an elongated extension portion capable of extending into a municipal valve box; and a handle portion. The valve actuator engaging portion has a valve opening key end and includes a light for illumination of the valve actuator in the valve box.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 9:
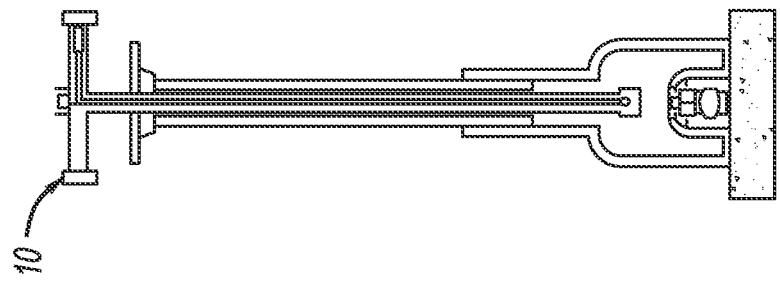
FIG. 9 is an illustrative side view showing the municipal valve key of the present invention deployed for use in a Curb Box application.
Figure 8:
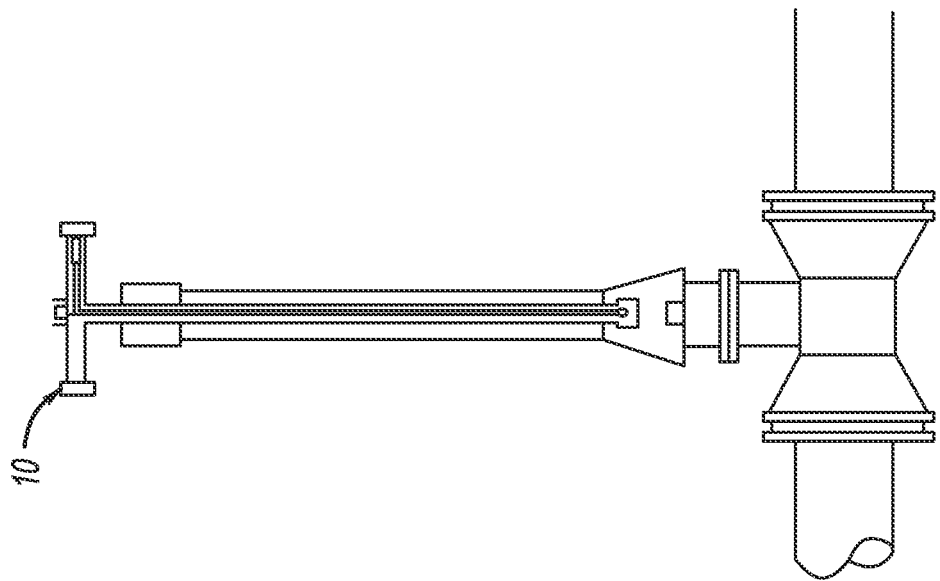
FIG. 8 is an illustrative side view showing the municipal valve key of the present invention deployed for use in a Valve Box application.
Figure 7:
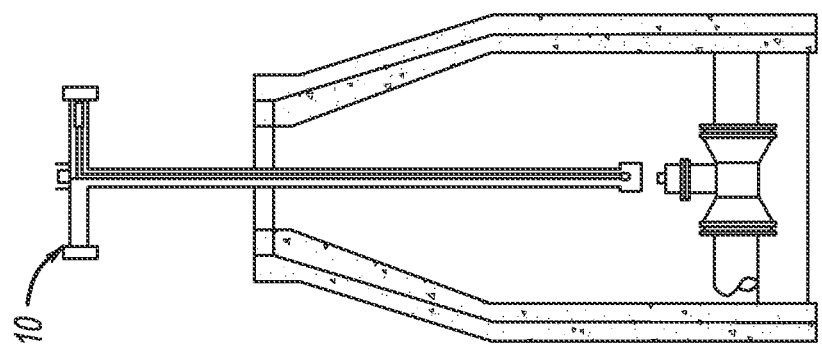
FIG. 7 is an illustrative side view showing the municipal valve key of the present invention deployed for use in a Gatewell application.

Referring to FIGS. 1A to FIG. 6, and in accordance with the present invention, there is provided a municipal valve key 10 which includes a valve actuator engaging portion 12; a metal or polymeric material elongated extension shaft portion 14 and a handle portion 16. The municipal valve key is designed such that the elongated extension shaft portion 14 is capable of extending into a municipal valve box, curb box or gatewell (see FIGS. 8, 9 and 7 respectively).

Municipal valves of the like for shutting off residential and commercial main lines are used in municipalities around the country. Typically, these are buried in a valve box below the frost line typically around 6 feet under the earth. The box is typically a long tubular member with a cap and the valve which requires shutting off and turning on is at the base of the box or gatewell.

Figure 1A:
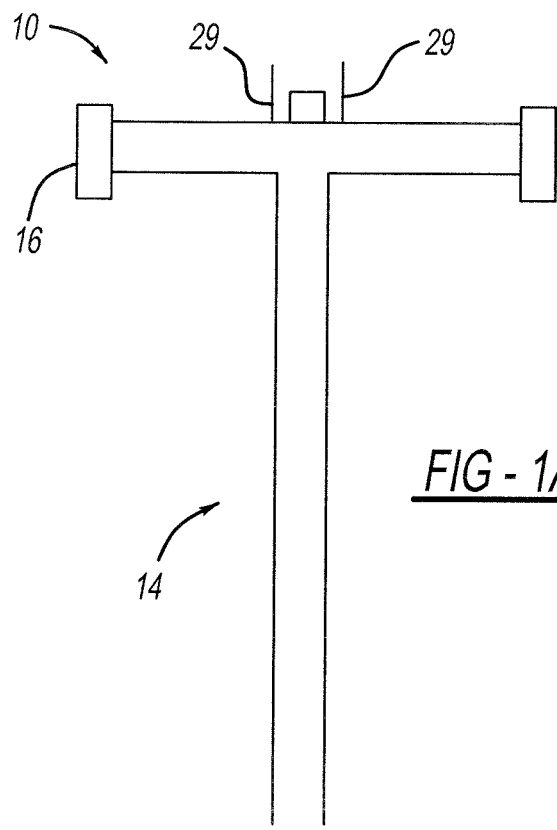
FIG. 1A is a side view partially broken away of a municipal valve key of the present invention.
Figure 2A:
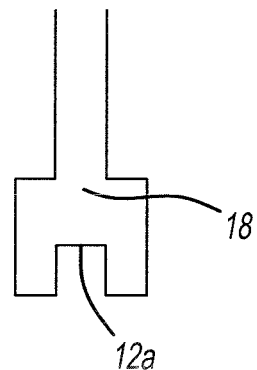
FIG. 2A is a partial side view of an alternate embodiment type of valve key engagement end head used in a municipal valve key of the present invention.
Figure 1B:
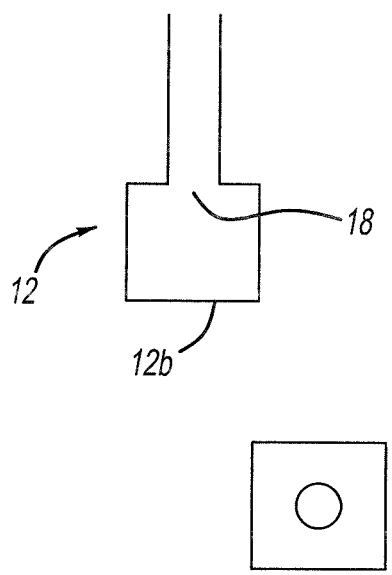
FIG. 1B is a bottom view partially broken away of the municipal valve key FIG. 1.
Figure 2B:
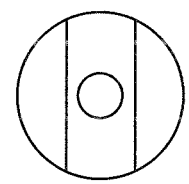
FIG. 2B is a bottom view partially broken away of the municipal valve key FIG. 2A.
Figure 3:
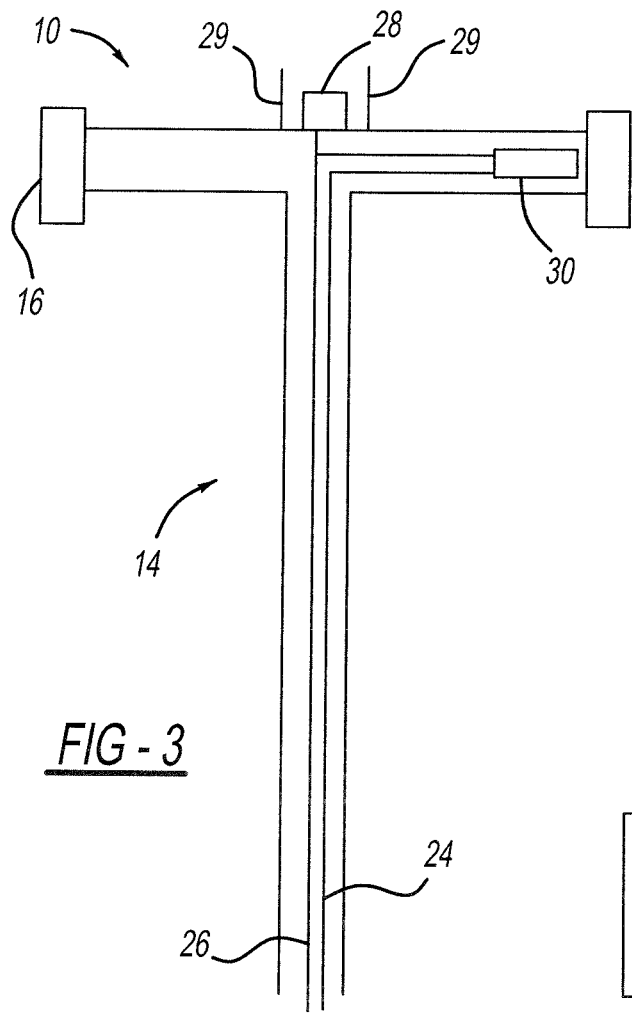
FIG. 3 is a sectional view of a municipal valve key of the present invention similar to that of FIG. 1A but having a recessed light.
Figure 4:
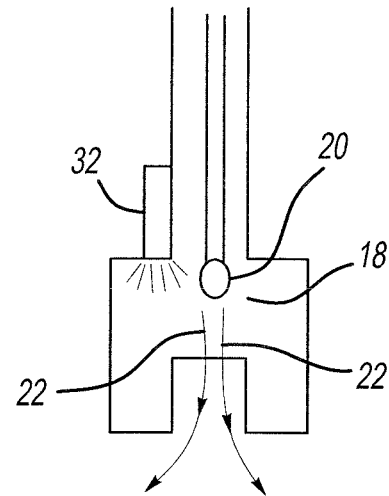
FIG. 4 is a partial sectional view of a municipal valve key of the present invention similar to that of FIG. 2A but having a recessed light.
Figure 5:
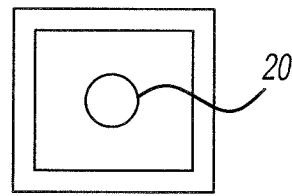
FIG. 5 is a bottom view of the municipal valve key of the present invention shown in FIG. 3.
Figure 6:
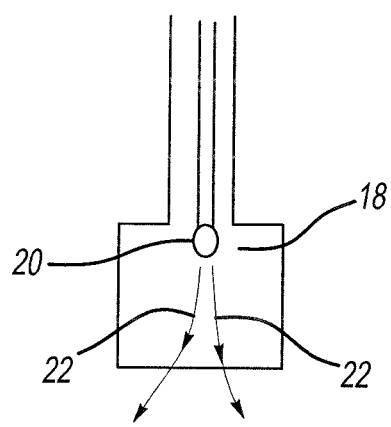
FIG. 6 is a bottom view of the municipal valve key of the present invention shown in FIG. 4.
Figure 6:
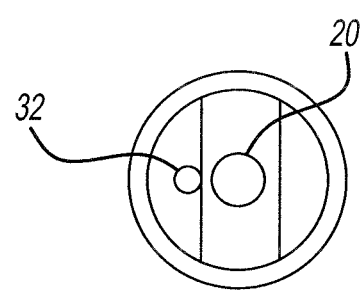

The valve actuator engaging portion 12 may be configured in any arrangement which is capable of engaging the valve for opening or closing the valve. As shown in the drawings, typically this will be a slotted member 12a or it has a box recess 12b. In either case a light (preferably an LED type light) is at the base 18 of the engagement end 12 and includes a light for illumination of the valve actuator in the valve box. In the embodiments of FIGS. 3-6, the light 20 is recessed in the base 18 of the valve actuator engaging portion. The light 20 shines out such as along arrows 22 such that it illuminates the valve actuator. The light 20 may be electrically connected by way of wires 24 and 26 to a switch 28 and a power source 30 such as a battery or the like. The battery 30 may be located in various locations such as the elongated shaft 14 or in the handle portion 16 as shown in FIG. 3. The switch 24 is a push button switch which requires pressure by the operator during use for turning on the light. A switch collar 29 is provided to protect the switch from damage. The switch automatically disengages when pressure is released in order to turn off the light 20 to preserve battery life. In the alternative, the switch 28 may be a timed switch setting a predetermined time period for the light 20. The time period may also be made adjustable.

In operation, the operator holds the key by the handle 16 and depresses the switch 28. The shaft 14 and valve actuator engaging portion 12 are inserted in the valve box which illuminates the valve at the base of the box and allows the operator to see the position of the valve actuator which allows proper adjustment of the actuation of the key such that the valve can be engaged. The operator rotates the key to actuate the valve in an on or off direction and the key is removed.

A camera 32 may be provided at the engagement end for an even better view of the valve actuator. The camera 32 may be turned on automatically by the switch 28. The camera 32 may also be wireless with broadcast capabilities to a cloud or to an operator's cellphone. The camera 32 may also provide its own source of light, and or may have infrared capabilities to detect heat differentials in the municipal valve to determine flow conditions in the valve and confirm the valve's operational state that the valve is open or closed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A municipal valve key comprising:
   a valve actuator engaging end;
   an elongated extension shaft portion capable of extending into a municipal valve box;
   a handle;
   a battery power source located in the handle; said valve actuator engaging end having a valve opening key and a battery powered LED light for illumination of a valve actuator in the valve box;
   a switch located on said handle with wires connected between the battery, the battery powered LED light and the switch, wherein the switch has a timed switch setting that sets a time period for the battery powered LED light, wherein the timed switch setting is adjustable to adjust the time period;
   wherein said switch is an uncapped vertically upward facing switch and said switch is a temporary on switch which requires operator pressure, and wherein said switch has a collar; and
   wherein said engaging end further includes a camera recessed in a base of said engaging end for a better view of the valve actuator, said camera additionally having a light source and said camera includes capabilities to detect a heat differential to determine flow in a municipal valve;
   and wherein the battery powered LED light and the camera light source cooperate wherein the battery powered LED light is recessed such that the battery powered LED light illuminates a key portion and surfaces facing the key portion such that the operator can see the valve actuator inside the municipal valve box and the camera light source illuminates the municipal valve to determine flow in the municipal valve via capabilities to detect heat differential.

2. The municipal valve key of claim 1 wherein said camera is a wireless camera.

3. The municipal valve key of claim 1 wherein said camera can broadcast to a cell phone.

4. The municipal valve key of claim 1 wherein said switch in the handle also turns on said camera.

5. The municipal valve key of claim 1 wherein said valve actuator engaging end is a slotted member.

6. The municipal valve key of claim 1 wherein said valve actuator engaging end has a boxed recess.

* * * * *